United States Patent Office 3,314,782
Patented Apr. 18, 1967

3,314,782
REFINING AGENT FOR STEEL-WORKS
Eric Arnaud, Lausanne, Switzerland, assignor to Anstalt fur technische Entwicklung und Verwertung
No Drawing. Filed Feb. 5, 1964, Ser. No. 342,794
Claims priority, application Switzerland, Dec. 12, 1963, 15,255/63
2 Claims. (Cl. 75—57)

Production of steel from melts containing variable amounts of cast iron and scrap iron (each varying from 0 to 100 percent by weight) takes place in converters, Siemens-Martin type furnaces, or in electric furnaces. The resulting metal afterwards must be subjected to a deoxidation treatment in order to render it forgeable and rollable. Deoxidation commonly is accomplished by addition of aluminum, magnesium, calcium, silicon, or another powerful reducing agent. During the deoxidation in the melt inclusions of oxides, e.g. of alumina, may be formed. These inclusions are solid at the casting temperature of steel and are more or less dispersed in the molten steel. As deoxidation is most often carried out with bars of deoxidation agent, preferably of aluminum, the local concentration of oxide, e.g. alumina, often results in string-like inclusions which generally gather on the surface of the finished product giving rise to surface defects.

One of the objects of the instant invention is to remedy this disadvantage and to provide an agent on the basis of aluminum, magnesium, calcium, silicon or another reducing agent which is utilizable in steel refinery and assures a good diffusion of the aluminum or any other reducing agent in the treated bulk and promotes the elimination of alumina or any other oxide produced.

According to the present invention a novel refining agent suitable for deoxidizing steel is provided which comprises a deoxidizing agent such as an alkaline earth metal, an earth metal or any other suitable reducing agent such as e.g. silicon and a fluxing agent.

In use the fluxing agent will favor the diffusion of the deoxidizing agent, e.g. aluminum, in the whole treated bulk and avoid inclusions of alumina. Said fluxing agent may consist of cryolite or any other compound having an analogous action.

According to a preferred embodiment of the invention the refining agent comprises further a melt promoting agent and/or an agent promoting the refining. Preferably the refining agent is in agglomerated form, e.g. in form of granules or the like.

The melt promoting agent reinforces the action exercised by the fluxing agent. It may consist e.g. of fluorspar or a compound having a similar action.

The agent promoting refining enhances the removal of oxides produced during the refining. It may consist e.g. of calcium hydroxide.

The refining agent of the instant invention may be added to the pouring ladle or the mold in a known manner. For the purpose of this addition the product may be present in different forms. Advantageous results, however, are obtained by using an agglomerated product such as small shot, granules, pastilles, globules, briquettes etc.

According to one embodiment the refining agent consists of small shots comprising a core of aluminum coated with the fluxing agent, e.g. cryolite. Preferably this small shot will have a spherical shape. By providing finely divided particles in use, a large contact surface between the treated product and the molten metal is obtained giving occasion to a very vigorous action. In case of particles of larger size, agglomeration of the undersized constituents of the melt may be assured by addition of the purifying agent.

Preferably, the deoxidizing agent is applied in the form of particles or powder; it is intimately mixed with the fluxing agent and if desired with the melt promoting agent in order to obtain an extremely homogenous action of these agents in the molten mass.

The fluxing agent together with the melt promoting agent, if any, may form a synthetic dross which is added to the steel, e.g. in the pouring ladle. Said synthetic dross is liquid at relatively low temperatures, generally below 1000° C. and its viscosity is low at the casting temperature of steel. Therefore it can be decanted easily. It should be able to dissolve a significant quantity of the oxidized reducing agent, e.g. alumina; according to this property the elimination of undesired materials produced during deoxidation is improved.

If the refining agent according to the above embodiment of the invention is present in the form of particles of a deoxidizing agent intimately mixed with a finely ground synthetic dross, each particle of the deoxidizing agent is obviously coated with particles of synthetic dross, so that the oxide e.g. alumina, as soon as the deoxidizing agent has come into contact with the steel, is dissolved by the synthetic dross which acts as decanting agent and favors the ascension of the alumina up to the natural slag present on the surface of the molten steel. This involves a vast elimination of the alumina and consequently avoids or at least strongly reduces the above mentioned surface defects on cast articles.

The mixture of the deoxidizing or reducing agent and the pulverulent synthetic dross may be used e.g. in the form of a powder mixture, of briquettes, granules or the like.

According to a further embodiment of the present invention the synthetic dross such as defined above may comprise additives such as sodium chloride, potassium chloride, magnesium chloride, barium chloride, etc. and in case of need, a binding material for facilitating the formation of briquettes or other agglomerates.

The invention is illustrated by the following examples of compositions suitable as refining agents. The examples are not to be construed as limiting.

Example 1

A composition according to the invention may be comprised of

| | Percent by weight |
|---|---|
| Deoxidizing agent | 5 to 95 |
| Fluxing agent | 0.2 to 35 |
| Melt promoting agent | 0.5 to 90 |
| Agent promoting refining | 0.5 to 90 |

Example 2

A further composition is comprised of

| | Percent by weight |
|---|---|
| Aluminum | 76.5 |
| Cryolite | 3.5 |
| Fluorspar | 10.0 |
| Calcium hydroxide | 10.0 |

Example 3

The following example shows a possible composition which includes a synthetic dross such as described before.

| | Percent by weight |
|---|---|
| Aluminum (particles or powder) | 20 to 80 |
| Cryolite | 10 to 40 |
| Fluorspar | 10 to 40 |

Example 4

A further composition is comprised of

| | Percent by weight |
|---|---|
| Aluminum | 50 |

|  | Percent by weight |
|---|---|
| Cryolite | 25 |
| Fluorspar | 25 |

Within the realm of technical equivalence, modifications may be employed in the performance without departing from the spirit of the invention.

I claim:

1. A refining agent for deoxidizing steel consisting of, from 5 to 95% by weight of a deoxidizing agent selected from the group consisting of aluminum, magnesium, calcuim, and silicon,
from 0.2 to 35% by weight of cryolite,
from 0.5 to 90% by weight of fluorspar, and
from 0.5 to 90% by weight of calcium hydroxide, the total of all components amounting to 100%.

2. A refining agent for deoxidizing steel consisting of, 76.5% by weight of aluminum,
3.5% by weight cryolite,
10.0% by weight fluorspar, and
10.0% by weight calcium hydroxide.

References Cited by the Examiner

UNITED STATES PATENTS

| 1,562,655 | 11/1925 | Pacz | 75—58 |
| 2,173,205 | 9/1939 | Johannsen | 75—57 |
| 2,496,074 | 1/1950 | Vignos | 75—58 |
| 2,819,956 | 1/1958 | Strauss | 75—57 |
| 2,988,445 | 6/1961 | Hurum | 75—58 |

FOREIGN PATENTS

| 542,921 | 2/1942 | Great Britain. |

BENJAMIN HENKIN, *Primary Examiner.*